United States Patent [19]

Lawson et al.

[11] Patent Number: 5,329,005

[45] Date of Patent: Jul. 12, 1994

[54] SOLUBLE ANIONIC POLYMERIZATION INITIATORS AND PREPARATION THEREOF

[75] Inventors: David F. Lawson, Uniontown, Ohio; Koichi Morita; Yoichi Ozawa, both of Ogawahigashimachi, Japan; Mark L. Stayer, Jr., Mogadore, Ohio; Ryota Fujio, Akigawa, Japan

[73] Assignee: Bridgestone Corporation, Tokyo, Japan

[21] Appl. No.: 955,582

[22] Filed: Oct. 2, 1992

[51] Int. Cl.$^5$ ............... C07D 487/08; C07D 295/00; C08F 4/48

[52] U.S. Cl. ................... 540/450; 540/477; 540/484; 540/520; 502/155; 502/157; 526/173; 526/180; 526/204; 526/217

[58] Field of Search ............... 526/180, 173, 204; 540/477, 520, 450, 484; 502/155, 157; 546/348

[56] References Cited

U.S. PATENT DOCUMENTS

| | | | |
|---|---|---|---|
| 2,849,432 | 8/1958 | Kibler et al. | 526/180 |
| 3,290,277 | 12/1966 | Anderson et al. | 526/180 X |
| 3,317,918 | 5/1967 | Foster | 260/83.7 |
| 3,426,006 | 2/1969 | Nützel et al. | 260/83.5 |
| 4,015,061 | 3/1977 | Schulz et al. | 526/178 |
| 4,316,001 | 2/1982 | Boileau et al. | 528/14 |
| 4,478,953 | 10/1984 | Yuki et al. | 502/155 |
| 4,931,376 | 6/1990 | Ikematsu et al. | 526/164 |
| 4,935,471 | 6/1990 | Halasa et al. | 525/359 |
| 4,978,754 | 12/1990 | Ibi et al. | 544/176 |
| 5,115,035 | 5/1992 | Shiraki et al. | 525/314 |
| 5,149,457 | 9/1992 | Smith | 252/182.12 |

FOREIGN PATENT DOCUMENTS 0316255 5/1989 European Pat. Off. .
7965788 11/1977 Japan .

OTHER PUBLICATIONS

Copolymerization of Butadiene and Styrene by Initiation With Aklyllithium and Alkali Metal tert-Butoxides, Wofford and Hsieh, J. of Polymer Science, vol. 7, 461-469 (1969).

Butadiene-Styrene Copolymerization Initiated by n-BuLi/THF/t-AmOK, Lehong et al; J. of Applied Polymer Science; vol. 44, 1499-1505 (1992).

The Microstructure of Butadiene and Styrene Copolymers Synthesized with n-BuLi/THF/t-AmOK, Lehong et al; J. of Applied Polymer Science, vol. 44, 1507-1511 (1992).

Anionic Polymerization Initiated by Diethylamide in Organic Solvents, Angood et al, Journal of Polymer Science, vol. 11, pp. 2777-2791 (1973).

Anionic Polymerization Initiators Containing Protected Functional Groups, Schulz et al, Journal of Polymer Science, vol. 15, pp. 2401-2410 (1977).

Anionic Polymerization, Cheng, American Chemical Society Symposium Series 166, American Chemical Society, pp. 513-527 (1981).

*Primary Examiner*—Fred Teskin
*Attorney, Agent, or Firm*—Daniel N. Hall

[57] ABSTRACT

The present invention is directed toward anionic polymerization initiators which are soluble in hydrocarbon solvents. The initiators include a lithio amine having the general formula ALi. The component A is a dialkyl or dicycloalkyl amine radical or a cyclic amine. The invention is also directed toward polymers and other products made using the initiator, and methods therefor. Further, the invention contemplates a polymer, a polymer composition and products therefrom, which include a functional group from the reaction product of an amine and an organolithium compound. The resulting polymers may be terminated with a terminating, coupling or linking agent, which may provide the polymer with a multifunctionality.

5 Claims, No Drawings

SOLUBLE ANIONIC POLYMERIZATION INITIATORS AND PREPARATION THEREOF

TECHNICAL FIELD

The subject invention relates to anionic polymerization resulting in diene polymer and copolymer elastomers. More particularly, the present invention relates to polymerization employing an amine initiator. Specifically, the invention relates to a lithium amine initiator which is soluble in hydrocarbon solvents, and which will reproducibly polymerize monomers in a controllable and narrow molecular weight distribution range.

BACKGROUND ART

When conducting polymerizations on a commercial basis, it is important to utilize process conditions and components which will allow the molecular weight of the end products to be narrowly and reproducibly defined. The characteristics of a given polymer and its usefulness, are dependent, among other things, upon its molecular weight. Hence, it is desirable to be able to predict with some certainty the molecular weight of the end product of the polymerization. When the molecular weight is not narrowly definable, or is not reproducible on a systematic basis, the process is not commercially viable.

In the art, it is desirable to produce elastomeric compounds exhibiting reduced hysteresis characteristics. Such elastomers, when compounded to form articles such as tires, power belts and the like, will show an increase in rebound, a decrease in rolling resistance and will have less heat build-up when mechanical stresses are applied.

A major source of hysteretic power loss has been established to be due to the section of the polymer chain from the last cross link of the vulcanizate to the end of the polymer chain. This free end cannot be involved in an efficient elastically recoverable process, and as a result, any energy transmitted to this section of the cured sample is lost as heat. It is known in the art that this type of mechanism can be reduced by preparing higher molecular weight polymers which will have fewer end groups. However, this procedure is not useful because processability of the rubber with compounding ingredients and during shaping operations decreases rapidly with increasing molecular weight.

It is difficult to obtain consistent properties, such as a reduction in hysteresis characteristics, if the polymer cannot be controllably reproduced in a narrow molecular weight range distribution. See, for example, U.S. Pat. No. 4,935,471, in which some polymers are prepared with a heterogeneous mixture of certain secondary amines, including lithium pyrrolidide. Polymers made in this manner have widely variable molecular weights, broad polydispersities, and their functional terminations tend to reproduce erratically, giving rise to poorly reproducible hysteresis reduction results.

A major drawback with many of these known initiators, is that they are not soluble in hydrocarbon solvents, such as hexane or cyclohexane. Polar solvents have heretofore been employed including the polar organic ethers such as dimethyl ether or diethyl ether, as well as other polar solvents including tetrahydrofuran, and diethylene glycol methyl ether (diglyme).

The present invention provides novel, hydrocarbon solvent soluble initiators for anionic polymerization. The invention provides for the incorporation of a functionality from the initiator to be incorporated at the head and tail of the polymer chain. The invention provides for efficient, controllable and reproducible polymerizations, with the preparation of well defined end-products of a relatively narrow molecular weight range distribution.

DISCLOSURE OF THE INVENTION

It is therefore, an object of the present invention to provide anionic polymerization initiators which are soluble in hydrocarbon solvents.

It is a further object of the present invention to provide a method of preparing such anionic polymerization initiators.

It is still a further object of the invention to provide an initiator which will reproducibly result in a polymer within a narrow, predictable molecular weight range.

It is an additional object of the invention to provide an initiator which will allow for the incorporation of a functional group at both the head and tail of the resulting polymer.

It is another object of the present invention to provide elastomers formed with such a polymerization initiator.

It is yet another object of the present invention to provide elastomers having a plurality of polymer molecules wherein substantially each molecule has a functional group from the initiator.

It is also an object of certain embodiments of the present invention to provide diene polymers and copolymers having reduced hysteresis characteristics.

It is a further object of the present invention to provide vulcanizable elastomeric compounds.

Still another object of the present invention is to provide an improved tire formed from an elastomer as described hereinabove.

At least one or more of these objects together with the advantages thereof over the existing art, which shall become apparent from the specification which follows, are accomplished by the invention as hereinafter described and claimed.

In general, the present invention relates to a hydrocarbon solvent soluble, anionic polymerization initiator which comprises a lithio amine having the general formula ALi, where A is selected from the group consisting of alkyl, dialkyl and cycloalkyl amine radicals having the general formula

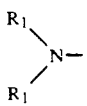

and cyclic amines having the general formula

where $R_1$ is selected from the group consisting of alkyls, cycloalkyls or aralkyls having from 1 to about 12 carbon atoms, and $R_2$ is selected from the group consisting of an alkylene group having from about 6 to about 8 methylene groups.

There is also provided according to the invention, a method of preparing an anionic polymerization initiator, which comprises the step of reacting an organolithium compound with a functionalizing agent. The functionalizing agent is selected from the group consisting of alkyl, dialkyl and cycloalkyl amine radicals having the general formula

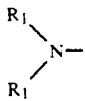

and cyclic amines having the general formula

where $R_1$ is selected from the group consisting of alkyls, cycloalkyls or aralkyls having from 1 to about 12 carbon atoms, and $R_2$ is selected from the group consisting of an alkylene group having from about 6 to about 8 methylene groups.

A functionalized polymer comprises a polymer chain carrying at least one functional group A wherein A is derived from a polymerization initiator having the general formula ALi, where A is selected from the group consisting of alkyl, dialkyl and cycloalkyl amine radicals having the general formula

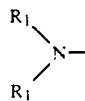

and cyclic amines having the general formula

where $R_1$ is selected from the group consisting of alkyls, cycloalkyls or aralkyls having from 1 to about 12 carbon atoms, and $R_2$ is selected from the group consisting of an alkylene group having from about 6 to about 8 methylene groups.

A method of forming a functionalized polymer comprises the steps of forming a solution of one or more anionically polymerizable monomers in a hydrocarbon solvent; and, polymerizing the monomers in the presence of an initiator which is soluble in the hydrocarbon solvent. The initiator comprises a lithio amine having the general formula ALi where A is selected from the group consisting of alkyl, dialkyl and cycloalkyl amine radicals having the general formula

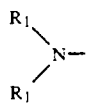

and cyclic amines having the general formula

where $R_1$ is selected from the group consisting of alkyls, cycloalkyls or aralkyls having from 1 to about 12 carbon atoms, and $R_2$ is selected from the group consisting of an alkylene group having from about 6 to about 8 methylene groups.

A vulcanizable elastomeric compound having reduced hysteresis properties comprises an elastomeric polymer having chains carrying the functional group A wherein A is derived from a polymerization initiator having the general formula ALi, where A is selected from the group consisting of alkyl, dialkyl and cycloalkyl amine radicals having the general formula

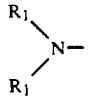

and cyclic amines having the general formula

where $R_1$ is selected from the group consisting of alkyls, cycloalkyls or aralkyls having from 1 to about 12 carbon atoms, and $R_2$ is selected from the group consisting of an alkylene group having from about 6 to about 8 methylene groups; and, from about 5 to 80 parts by weight of carbon black, per 100 parts of the polymer.

A tire having decreased rolling resistance resulting from a treadstock containing a vulcanizable elastomeric composition which comprises an elastomeric polymer having chains carrying at least one functional group A wherein A is derived from a polymerization initiator having the general formula ALi, where A is selected from the group consisting of alkyl, dialkyl and cycloalkyl amine radicals having the general formula

and cyclic amines having the general formula

where $R_1$ is selected from the group consisting of alkyls, cycloalkyls or aralkyls having from 1 to about 12 carbon atoms, and $R_2$ is selected from the group consisting of an alkylene group having from about 6 to about 8 methylene groups; and, from about 5 to 80 parts by weight of carbon black, per 100 parts of the polymer.

A vulcanizable rubber composition comprises a polymer carrying at least one amine functional group A, wherein A is derived from the reaction product of an organolithium compound and an amine; and a tin-carbon bond.

A multifunctional polymer comprises at least one amine functional group A, wherein A is derived from the reaction product of an organolithium compound and an amine; and, a tin-carbon bond.

A tire having at least one vulcanizable elastomeric component which comprises a multifunctional polymer having at least one amine functional group A, wherein A is derived from a polymerization initiator which is the reaction product of an organolithium compound and an amine, wherein the multifunctional polymer has a tin-carbon bond, and from about 5 to 80 parts by weight of carbon black, per 100 parts of the polymer.

A rubber composition comprises a polymer carrying at least one amine functional group A, wherein A is derived from the reaction product of an organolithium compound and an amine; and a second functional group selected and derived from the group consisting of terminating agents, coupling agents and linking agents.

A multifunctional polymer comprises at least one amine functional group A, wherein A is derived from the reaction product of an organolithium compound and an amine; and a second functional group selected and derived from the group consisting of terminating agents, coupling agents and linking agents.

A tire having at least one vulcanizable elastomeric component which comprises a multifunctional polymer having at least one amine functional group A, wherein A is derived from a polymerization initiator which is the reaction product of an organolithium compound and an amine. The polymer has a second functional group selected and derived from the group consisting of terminating agents, coupling agents and linking agents. The elastomeric component also comprises from about 5 to 80 parts by weight of carbon black, per 100 parts of the polymer.

PREFERRED EMBODIMENT FOR CARRYING OUT THE INVENTION

As will become apparent from the description which follows, the present invention provides novel polymerization initiators which are soluble in hydrocarbon solvents, such as preferably, cycloalkanes such as cyclohexane, cycloheptane, derivatives thereof and the like, and mixtures of these with alkanes such as hexane, pentane, heptane, octane, their alkylated derivatives, and the like. It has also been discovered herein that certain vulcanizable elastomeric compounds and articles thereof based upon such polymers formed using such initiators, exhibit useful properties, such as for example, reproducible relatively narrow molecular weight ranges. Furthermore, such polymers also contain a functionality from the initiator, which functionality is useful for example, in reducing hysteresis characteristics in the resulting polymers.

While the initiators of the present invention are soluble in hydrocarbon solvents, it will be appreciated that the use of the initiators in other solvents is also within the scope of the invention.

The preferred initiator according to the invention, is the N-lithio salt of an amine. The preferred initiator is therefore, a hydrocarbon soluble lithio amine having the general formula ALi.

The A component represents the amine functionality to be incorporated at the initiation site or the head of the resulting polymer. For example, A may be a dialkyl or dicycloalkyl amine radical having the general formula

or a cyclic amine having the general formula

In these formulas, R₁ is an alkyl, cycloalkyl or aralkyl having from 1 to about 20 carbon atoms, where both R₁ groups may be the same or different, and R₂ is an alkylene group having from about 6 to about 8 methylene groups. R₂ may be bicyclic, such that two methylene groups therein are bridged to form a bicycloalkane. By "bridged" it is understood to mean that two non-adjacent methylene groups in a larger ring are connected, either by bonding directly or through an alkylene group having one or more methylene groups, thus forming a bicyclic structure of smaller rings.

Exemplary R₁ groups include methyl, ethyl, butyl, octyl, cyclohexyl, 3-phenyl-1-propyl, isobutyl and the like. Exemplary R₂ groups include hexamethylene, heptamethylene, bicyclooctane, bicyclononae and the like.

For example, A may be hexamethyleneimine; azacyclooctane; 1,3,3-trimethyl-6-azabicyclo[3.2.1]octane; diisobutyl amine; 3-azabicyclo-[3.2.2]nonane; n-butyl isobutyl amine; or the like.

It has been found that when R₁ or R₂ are a di-t-butyl group, a diisopropyl group or the like, the resulting polymerizations are slow, presumably due to hinderence around the nitrogen at the initiation site. Hence, in a preferred embodiment of the invention, the carbon atoms in R₁ and R₂ which are bonded to the nitrogen in the amine, are also bonded to a total of at least three hydrogen atoms.

The initiator according to the present invention can be formed by preparing a solution of the amine component A, in an anhydrous, aprotic hydrocarbon solvent, such as hexane or cyclohexane. To this solution is then added an organolithium catalyst in the same or a similar solvent. The organolithium compound has the general formula RLi where R is selected from the group consisting of alkyls, cycloalkyls, alkenyls, aryls and aralkyls having from 1 to about 20 carbon atoms and short chain length low molecular weight polymers from diolefin and vinyl aryl monomers having up to about 25 units. Typical alkyls include n-butyl, s-butyl, methyl, ethyl, isopropyl and the like. The cycloalkyls include cyclohexyl, menthyl and the like. The alkenyls include allyl, vinyl and the like. The aryl and aralkyl groups include phenyl, benzyl, oligo(styryl) and the like. Exemplary short chain length polymers include the oligo(butadienyls), oligo(isoprenyls), oligo(styryls) and the like.

The two components are allowed to react for up to about one hour at ambient temperature (25° to 30° C.), or elevated temperatures up to about 100° C. preferably at less than 50° C., and more preferably at less than 38° C., following which the catalyst is ready for use. The initiators according to the present invention are considered to be soluble if they remain in solution within an excess of a hydrocarbon solvent for about three (3) or more days.

As stated above, the initiator thus formed may be employed as an initiator to prepare any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers and copolymers thereof with monovinyl aromatic polymers. Suitable monomers include conjugated dienes having from about 4 to about 12 carbon atoms and monovinyl aromatic monomers having 8 to 18 carbon atoms and trienes. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, a-methylstyrene, p-methylstyrene, vinyltoluene and vinylnaphtalene. The conjugated diene monomer and aromatic vinyl monomer are normally used at the weight ratios of 95-50:5-50, preferably 95-65:5-35.

Polymerization is conducted in a hydrocarbon solvent, such as the various cyclic and acyclic hexanes, heptanes, octanes, pentanes, their alkylated derivatives, and mixtures thereof. In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed.

Compounds useful as polar coordinators are organic and include tetrahydrofuran (THF), linear and cyclic oligomeric oxolanyl alkanes such as 2-2'-di(tetrahydrofuryl) propane, di-piperidyl ethane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, owned by the Assignee of record, the subject matter of which is incorporated herein by reference. Compounds useful as polar coordinators include those having an oxygen or nitrogen hetero-atom and a non-bonded pair of electrons. Other examples include dialkyl ethers of mono and oligo alkylene glycols; "crown" ethers; tertiary amines such as tetramethylethylene diamine (TMEDA); linear THF oligomers; and the like.

A batch polymerization is begun by charging a blend of monomer(s) and normal alkane solvent to a suitable reaction vessel, followed by the addition of the polar coordinator (if employed) and the initiator compound previously described. The reactants are heated to a temperature of from about 20° to about 200° C., and the polymerization is allowed to proceed for from about 0.1 to about 24 hours. A functional amine group is derived from the initiator compound and attaches at the initiation site. Thus, substantially every resulting polymer chain has the following general formula AYLi where A is as described above, and Y is a divalent polymer radical which is derived from any of the foregoing diene homopolymers, monovinyl aromatic polymers, diene/monovinyl aromatic random copolymers and block copolymers. The monomer addition at the lithium end causes the molecular weight of the polymer to increase as the polymerization continues.

To terminate the polymerization, and thus further control polymer molecular weight, a terminating agent, coupling agent or linking agent may be employed, all of these agents being collectively referred to herein as "terminating agents". Certain of these agents may provide the resulting polymer with a multifunctionality. That is, the polymers initiated according to the present invention, may carry at least one amine functional group A as discussed hereinabove, and may also carry a second functional group selected and derived from the group consisting of terminating agents, coupling agents and linking agents.

Useful terminating, coupling or linking agents include active hydrogen compounds such as water or alcohol; carbon dioxide; N,N,N',N'-tetradialkyl-diaminobenzophenone (such as tetramethyldiaminobenzophenone or the like); N,N-dialkylaminobenzaldehyde (such as dimethylaminobenzaldehyde or the like); 1,3-dialkyl-2-imidazolidinones (such as 1,3-dimethyl-2-imidazolidinone or the like); 1-alkyl substituted pyrrolidinones; 1-aryl substituted pyrrolidinones; dialkyl- and dicycloalkyl-carbodiimides having from about 5 to about 20 carbon atoms; $(R_3)_a ZX_b$;

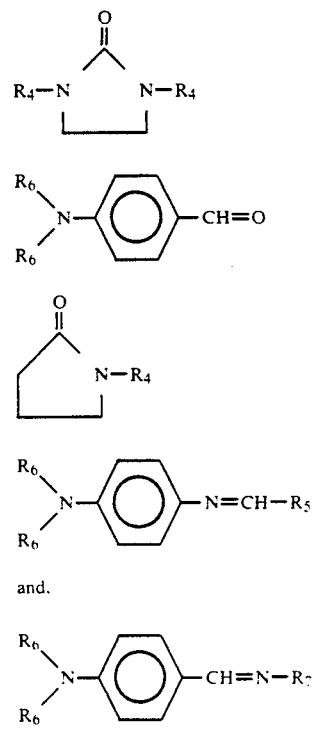

and, where Z is tin or silicon. It is preferred that Z is tin.

$R_3$ is an alkyl having from about 1 to about 20 carbon atoms; a cycloalkyl having from about 3 to about 20 carbon atoms; an aryl having from about 6 to about 20 carbon atoms; or, an aralkyl having from about 7 to about 20 carbon atoms. For example, $R_3$ may include methyl, ethyl, n-butyl, neophyl, phenyl, cyclohexyl or the like.

X is chlorine or bromine, "a" is from 0 to 3, and "b" is from about 1 to 4; where $a+b=4$.

Each $R_4$ is the same or different and is an alkyl, cycloalkyl or aryl, having from about 1 to about 12 carbon atoms. For example, $R_4$ may include methyl, ethyl, nonyl, t-butyl, phenyl or the like.

$R_5$ is an alkyl, phenyl, alkylphenyl or dialkylaminophenyl, having from about 1 to about 20 carbon atoms. For example, $R_5$ may include t-butyl, 2-methyl-4-pentene-2-yl, phenyl, p-tolyl, p-butylphenyl, p-dodecylphenyl, p-diethyl-aminophenyl, p-(pyrrolidino)phenyl, and the like.

Each $R_6$ is the same or different, and is an alkyl or cycloalkyl having from about 1 to about 12 carbon atoms. Two of the $R_6$ groups may together form a cyclic group. For example, $R_6$ may include methyl, ethyl, octyl, tetramethylene, pentamethylene, cyclohexyl or the like.

$R_7$ may include alkyl, phenyl, alkylphenyl or dialkylaminophenyl, having from about 1 to about 20 carbon atoms. For example, $R_7$ may include methyl, butyl, phenyl, p-butylphenyl, p-nonylphenyl, p-dimethylaminophenyl, p-diethylaminophenyl, p-(piperidino)pehnyl, or the like.

Other examples of useful terminating agents include tin tetrachloride, $(R_1)_3SnCl$, $(R_1)_2SnCl_2$, $R_1SnCl_3$, carbodiimides, N-methylpyrrolidine, cyclic amides, cyclic ureas, isocyanates, Schiff bases, 4,4'-bis(diethylamino) benzophenone, and the like, where $R_1$ is as described hereinabove.

The terminating agent is added to the reaction vessel, and the vessel is agitated for about 1 to about 1000 minutes. As a result, an elastomer is produced having an even greater affinity for compounding materials such as carbon black, and hence, even further reduced hysteresis. Additional examples of terminating agents include those found in U.S. Pat. No. 4,616,069 which is herein incorporated by reference.

The polymer may be separated from the solvent by conventional techniques. These include steam or alcohol coagulation, thermal desolventization, or any other suitable method. Additionally, solvent may be removed from the resulting polymer by drum drying, extruder drying, vacuum drying or the like.

The elastomers of the present invention comprise a plurality of polymers, having a functional group at both the head and tail of the resulting polymer. Such compounding may result in products exhibiting reduced hysteresis, which means a product having increased rebound, decreased rolling resistance and has less heat build-up when subjected to mechanical stress.

It has also been found, as will be exemplified hereinbelow, that polymers formed using the initiators of the invention, are reproducibly polymerizable in a relatively narrow range of molecular weights, such that substantially consistently reproducible polymers are possible with a molecular weight range of about 20,000 to about 250,000.

The polymers of the present invention can be used alone or in combination with other elastomers to prepare a product such as a tire treadstock, sidewall stock or other tire component stock compound. At least one such component is produced from a vulcanizable elastomeric or rubber composition. For example, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely such as between 10 and 99 percent by weight.

The polymers can be compounded with carbon black in amounts ranging from about 20 to about 100 parts by weight, per 100 parts of rubber (phr), with about 40 to about 70 phr being preferred. The carbon blacks may include any of the commonly available, commercially-produced carbon blacks but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethylammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following TABLE I.

TABLE I

| CARBON BLACKS | |
|---|---|
| ASTM Designation (D-1765-82a) | Surface Area ($m^2/g$) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred. The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365-468, particularly "Vulcanization Agents and Auxiliary Materials" pp. 390-402. Vulcanizing agents may be used alone or in combination.

Vulcanizable elastomeric compositions of the invention can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

General Experimental

In order to demonstrate the preparation and properties of the initiators and elastomers according to the present invention, a number of such initiators and elastomers were prepared. More particularly, initiators were prepared wherein the A group was hexamethyleneimine and wherein A was 1,3,3-trimethyl-6-azabicyclo[3.2.1]octane. A solution of styrene and butadiene monomers in hexane was prepared and was polymerized with these initiators. As noted above, various techniques known in the art for carrying out polymerizations may be employed without departing from the scope of the present invention.

EXAMPLE NO. 1

Preparation of Initiator 1,3,3-trimethyl-6-azabicyclo[3.2.1]octane, "TABO", was vacuum distilled from calcium hydride and transferred under nitrogen to a dried, nitrogen-purged bottle. The N-lithio salt of 1,3,3-trimethyl-6-azabicyclo[3.2.1]octane, "LTABO", was prepared by treating 10 milliequivalent or "meq" of a 1.11M solution of the bicyclic amine in hexanes with 10 meq 1.67M solution of n-butyllithium in hexanes, swirling the mixture at room temperature overnight. The resulting solution was clear and a very faint yellowish color. This was in marked contrast to mixtures of N-lithiopyrrolidinide made in hexanes in the same manner without solubilization measures, in which heavy precipitation was observed to occur readily. The LTABO solution was stable for days at room temperature. Samples were drawn from it by syringe for use in initiating polymerization.

Polymerization of Butadiene and Styrene with LTABO

A 0.67M solution of the above initiator was added to a 80%/20% by weight blend of butadiene and styrene in hexanes, at a level of 1.0 meq Li/100 g monomer, and N,N,N',N'-tetramethylethylenediamine (TMEDA) was added at 0.27 TMEDA/Li. The mixture was agitated at 50° C. for 1-2 hr. proceeding to approximately 100% conversion to polymer. In practice, there is considerable leeway in the reaction times and temperatures, much the same is there is leeway in the reaction vessels, type of agitation, etc., used. The treated cements then were quenched by injection with 1.5 ml of i-PrOH, treated with an antioxidant (3 ml of a mixture containing 1.6 wt % DBPC in hexane), coagulated in i-PrOH, air-dried at room temperature, then drum-dried. Suitable characterizations were performed. The product polymer reported as Polymer A hereinbelow, contained 19.4% styrene (0.7% block), 42.3% vinyl (52.5% vinyl if BD=100%), Tg −41.6° C., GPC(THF): $M_n$ 99694, MWD 1.82, raw ML/4/100=22.

Polymerization of Butadiene and Styrene with LTABO, and End-linking with SnCl4

The above procedure was followed exactly, except that after one hour of polymerization at 50° C., the polymerization mixture was treated with 0.7 equivalent of $SnCl_4$ per equivalent of Li charged. The product polymer, reported as Polymer B hereinbelow, was worked up in the same manner as above. The product polymer contained 17.2% styrene (0.4% block), 43.1% vinyl (52.1% vinyl if BD=100%), Tg −42.5° C., GPC(THF): $M_n$ 107253, MWD 3.09, ca. 30% high molecular weight; raw ML/4/100=51.

Evaluation of Compounded Properties

The product polymers A and B were compounded and tested as indicated in the test recipe shown in TABLE II, and cured for 20 minutes at 165° C. Results of physical tests are reported in TABLE III hereinbelow.

TABLE II

| Ingredient | Mix Order | Parts per Hundred Parts Rubber | |
|---|---|---|---|
| Polymer | 1 | 100 | Masterbatch |
| Naphthentic oil | 2 | 10 | 145-155° C., 60 RPM |
| Carbon black, N-351 | 3 | 55 | |
| ZnO | 4 | 3 | |
| Antioxidant | 5 | 1 | |
| Wax blend | 6 | 2 | |
| Total Masterbatch: | | 171 | |
| Stearic acid | | 2 | Final |
| Sulfur | | 1.5 | 77-93° C., 40 RPM |
| Accelerator | | 1 | |
| Total Final: | | 175.5 | |

TABLE III

| | PHYSICAL TESTS OF LTABO INITIATOR | | | | | |
|---|---|---|---|---|---|---|
| | ML/4/212 | | 1 Hz Dynastat tan δ | Ring Stress-Strain, R.T. | | |
| Polymer | (gum) | (cpd) | 50° C. | M300 | T.S. | % Eb |
| A | 22 | 60 | 0.119 | 2338 | 3133 | 430 |
| B | 51 | 70 | 0.119 | 2701 | 3668 | 427 |

In addition, the carbon-bound rubber content of the uncured, final compounded stocks of Polymers A and Polymer B were 29% and 40%, respectively. This indicates an enhanced interaction between the polymer and carbon black in these cases, compared to unmodified rubber, which typically exhibits 20-22% carbon-bound rubber, and butyllithium-initiated, Sn-coupled rubber, which typically exhibits 31-33% carbon-bound rubber. The results of this test show the reduced hysteresis in these polymers. The Dynastat tan δ(50° C.)=0.119 is about 40% below the value expected for an unmodified polymer of this molecular weight, prepared using a typical alkyllithium initiator.

EXAMPLE NO. 2

Preparation of Initiator

Hexamethyleneimine, "HMI", was distilled from calcium hydride and transferred under nitrogen to a dried, nitrogen-purged bottle. The N-lithio salt of hexamethyleneimine, "LHMI", was prepared by treating 30 meq of a 2.24M solution of the cyclic amine in 85:15 (weight/weight) cyclohexane:hexanes with 30 meq of a 1.67M solution of n-butyllithium in hexanes, swirling the mixture at room temperature overnight. The resulting solution was a clear, pale yellow. As noted above, this was in marked contrast to mixtures of N-lithiopyrrolidide and some other lithium hydrocarbon amides made in cyclohexane or hexanes in the same manner without solubilization measures, in which heavy precipitation was observed to occur readily. The LHMI solution was stable for several days at room temperature. Samples were drawn from it by syringe for use in initiating polymerization.

Polymerization of Butadiene and Styrene with LHMI

A 0.96M solution of the above initiator was added to a 80%/20% by weight blend of butadiene and styrene in hexanes, at a level of 1.0 meq Li/100 g monomer, and N,N,N',N'-tetramethylethylenediamine ("TMEDA") was added at 0.30 TMEDA/Li. The mixture was agitated at 50° C. for 3 hr. proceeding to approximately 100% conversion to polymer. The polymerization was carried out substantially as indicated in the earlier examples. The product polymer reported as Polymer C hereinbelow, contained 19.6% styrene (2% block), 34.9% vinyl (43.5% vinyl if BD=100%). Tg −50° C., GPC(THF): $M_n$ 103152, MWD 1.27, raw ML/4/100=15.

Polymerization of Butadiene and Styrene with LHMI, and End-linking with SnCl4

The above procedure was followed exactly, except that after 1.5 hr of polymerization at 50° C., the polymerization mixture was treated with 0.8 equivalent of SnCl4 per equivalent of Li charged. The product was worked up in the same manner as above. The product polymer reported as Polymer D hereinbelow, contained 19.0% styrene (0.8% block), 39.9% vinyl (49.4% vinyl if BD=100%), Tg −45° C., GPC(THF): $M_n$ 164726, MWD 1.82, ca. 52% high molecular weight; raw ML/4/100=71.

Evaluation of Compounded Properties

The product polymers C and D were compounded and tested as indicated in the test recipe shown in TABLE II hereinabove, and cured for 20 minutes at 165° C. Results of physical tests are reported in TABLE IV hereinbelow.

TABLE IV

PHYSICAL TESTS OF HMI INITIATOR

| Polymer | ML/4/212 (gum) | ML/4/212 (cpd) | 1 Hz Dynastat tan δ 50° C. | Ring Stress-Strain, R.T. M300 | T.S. | % Eb |
|---|---|---|---|---|---|---|
| C | 15 | 65 | 0.093 | 2780 | 3542 | 409 |
| D | 71 | 102 | 0.080 | 2896 | 3549 | 399 |

The results of this test show reduced hysteresis in these polymers. The Dynastat tan δ (50° C.)=0.093 is about 50 percent below the value expected for an unmodified polymer of this molecular weight, prepared using a typical alkyllithium initiator.

A preferred method of preparing the initiators according to the invention, will now be described. A vessel, such as a small bottle containing a Teflon or glass-clad magnetic stirring bar, is dried, sealed, and purged with nitrogen. The following is added by syringe while stirring:
1. 30 mmol anhydrous amine in hydrocarbon solvent, and
2. 30.1 mmol of alkyl lithium in hydrocarbon solvent is added by syringe at once, with stirring, while taking precaution for back-pressures.

The solution may heat and develop pressure immediately, but will soon begin to cool back down. When larger amounts of reagent are prepared, e.g. 250-300 mmol in large bottles or 0.5-1.5 mol in reactors, best results are obtained when chilled or cold water cooling is used to keep the peak temperature at about 38° C. or below. The normal procedure has been to allow the mixture to stir overnight at room temperature before using. However, the reaction is essentially complete within minutes. The mixture should be clear, straw-yellow, without significant precipitation. Light-to-moderate haziness or cloudiness does not appear to affect activity. Anhydrous conditions are required. Hydrocarbon solvent solutions with less than 30 ppm of water give best results. Initiator reagents can be stored under positive nitrogen pressures for periods of from several days up to about a week or more at room temperature (25°-27° C.).

It should now be clear from the foregoing examples and specification disclosure, that initiators according to the present invention are useful for the anionic polymerization of diene monomers. Reproducible polymerization of such polymers within a relatively narrow molecular weight range is achieved, and the resulting polymers also exhibit good preservation of live C-Li ends.

It is to be understood that the invention is not limited to the specific initiator reactants, monomers, terminators, polar coordinators or solvents disclosed herein, except as otherwise stated in the specification. Similarly, the examples have been provided merely to demonstrate practice of the subject invention and do not constitute limitations of the invention. Those skilled in the art may readily select other monomers and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A hydrocarbon solvent soluble, anionic polymerization initiator for the preparation of a polymer having reduced hysteresis characteristics, comprising: a lithio amine having the general formula ALi where A is selected from the group consisting of cyclic amine radicals having the general formula

where $R_2$ is selected from the group consisting of an alkylene group having from about 6 to about 8 methylene groups.

2. An anionic polymerization initiator, as set forth in claim 1, wherein $R_2$ includes two methylene groups which are bridged to form a bicycloalkane.

3. An anionic polymerization initiator, as set forth in claim 1, wherein A is selected from the group consisting of hexamethyleneimine, 1,3,3-trimethyl-6-azabicyclo [3.1]octane, and azacyclooctane.

4. A method of preparing an anionic polymerization initiator for the preparation of a polymer having reduced hysteresis characteristics, comprising the step of: reacting an organolithium compound with a functionalizing agent; said functionalizing agent being selected from the group consisting of cyclic amines having the general formula

where $R_2$ is selected from the group consisting of an alkylene group having from about 6 to about 8 methylene groups.

5. A method of preparing an anionic polymerization initiator, as set forth in claim 4, wherein said organolithium compound has the general formula RLi where R is selected from the group consisting of alkyls, cycloalkyls, alkenyls, aryls and aralkyls having from 1 to about 20 carbon atoms and short chain length low molecular weight polymers from diolefin and vinyl aryl monomers having up to about 25 units.

* * * * *